US012316674B1

(12) United States Patent
Jiang et al.

(10) Patent No.: US 12,316,674 B1
(45) Date of Patent: May 27, 2025

(54) SECURING NETWORK TRAFFIC BETWEEN A WEB CLIENT AND A SECURE WEB GATEWAY

(71) Applicant: Trend Micro Incorporated, Tokyo (JP)

(72) Inventors: Juliang Jiang, Nanjing (CN); Bin Shi, Nanjing (CN); Shujun An, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 270 days.

(21) Appl. No.: 18/193,290

(22) Filed: Mar. 30, 2023

(51) Int. Cl.
*H04L 9/40* (2022.01)

(52) U.S. Cl.
CPC ........ *H04L 63/166* (2013.01); *H04L 63/0236* (2013.01)

(58) Field of Classification Search
CPC ................. H04L 63/166; H04L 63/0236
See application file for complete search history.

(56) References Cited

U.S. PATENT DOCUMENTS

| | | | | |
|---|---|---|---|---|
| 8,464,318 | B1 * | 6/2013 | Hallak | H04L 63/1416 726/4 |
| 8,943,570 | B1 * | 1/2015 | Kalbag | H04L 63/0815 726/8 |
| 9,661,362 | B1 * | 5/2017 | Nelson | H04N 21/4425 |
| 10,972,453 | B1 * | 4/2021 | Natarajan | H04L 63/0807 |
| 12,081,550 | B1 * | 9/2024 | Zhang | H04L 41/16 |
| 12,149,623 | B2 * | 11/2024 | Sandoval | G06F 21/554 |
| 2003/0023717 | A1 * | 1/2003 | Lister | H04L 41/0896 709/224 |
| 2005/0108517 | A1 * | 5/2005 | Dillon | H04L 69/329 713/150 |
| 2007/0214232 | A1 * | 9/2007 | Belimpasakis | H04L 12/2818 709/217 |
| 2008/0178278 | A1 * | 7/2008 | Grinstein | H04L 63/0227 726/12 |
| 2008/0183902 | A1 * | 7/2008 | Cooper | H04L 67/02 709/250 |

(Continued)

OTHER PUBLICATIONS

Singh, Kapil, et al. "Practical end-to-end web content integrity." Proceedings of the 21st international conference on World Wide Web. 2012.*

(Continued)

*Primary Examiner* — Jimmy H Tran
(74) *Attorney, Agent, or Firm* — Beyer Law Group LLP

(57) ABSTRACT

A secure web gateway is deployed on the cloud between a web client and a web server. The secure web gateway sends the web client a redirect response status code with a replacement server location in response to a Hypertext Transfer Protocol (HTTP) request sent by the web client to access a target resource on the web server. The secure web gateway thereafter receives from the web client a Hypertext Transfer Protocol Secure (HTTPS) request to access the target resource, the HTTPS request includes the replacement server location. The secure web gateway sends the HTTPS request as an HTTP request to the web server. The secure web gateway receives an HTTP response from the web server, and forwards the HTTP response as an HTTPS response to the web client.

20 Claims, 8 Drawing Sheets

(56) References Cited

U.S. PATENT DOCUMENTS

| | | | | |
|---|---|---|---|---|
| 2010/0263032 | A1* | 10/2010 | Bhuyan | H04L 63/061 726/12 |
| 2012/0151045 | A1* | 6/2012 | Anakata | G06F 11/3438 709/224 |
| 2012/0180135 | A1* | 7/2012 | Hodges | G06Q 10/10 709/224 |
| 2013/0007194 | A1* | 1/2013 | Doleh | H04L 67/02 709/217 |
| 2013/0170502 | A1* | 7/2013 | Chen | H04L 12/4641 370/401 |
| 2013/0188644 | A1* | 7/2013 | Chen | H04L 65/1016 370/392 |
| 2014/0280883 | A1* | 9/2014 | Pieczul | H04L 67/563 709/224 |
| 2015/0052217 | A1* | 2/2015 | Benguerah | H04L 67/02 709/217 |
| 2015/0334029 | A1* | 11/2015 | Patil | H04L 41/5019 370/235 |
| 2016/0006693 | A1* | 1/2016 | Salcedo | H04L 63/0414 726/1 |
| 2016/0241633 | A1* | 8/2016 | Overby, Jr. | H04L 67/02 |
| 2018/0004765 | A1* | 1/2018 | Holloway | H04L 61/4511 |
| 2018/0176192 | A1* | 6/2018 | Davis | H04L 63/166 |
| 2018/0176193 | A1* | 6/2018 | Davis | H04L 9/3247 |
| 2018/0295134 | A1* | 10/2018 | Gupta | H04L 67/56 |
| 2019/0245699 | A1* | 8/2019 | Irwan | H04L 63/166 |
| 2019/0386961 | A1* | 12/2019 | Kupisiewicz | H04L 61/4511 |
| 2020/0128038 | A1* | 4/2020 | Neystadt | H04L 63/20 |
| 2020/0389526 | A1* | 12/2020 | Singleton, IV | H04L 67/141 |
| 2021/0203655 | A1* | 7/2021 | Rykowski | G06F 21/44 |
| 2021/0219137 | A1* | 7/2021 | S Bykampadi | H04L 63/166 |
| 2022/0247761 | A1* | 8/2022 | Subbanna | H04L 63/20 |
| 2022/0247829 | A1* | 8/2022 | Vilcinskas | H04L 67/56 |
| 2022/0360565 | A1* | 11/2022 | Shribman | H04L 67/56 |
| 2022/0366001 | A1* | 11/2022 | Shribman | H04L 67/01 |
| 2023/0155814 | A1* | 5/2023 | Qiu | H04L 9/0866 380/277 |
| 2023/0367833 | A1* | 11/2023 | Kol | H04L 63/0227 |
| 2024/0154965 | A1* | 5/2024 | Kim | H04L 63/10 |
| 2024/0276562 | A1* | 8/2024 | Muñoz De La Torre Alonso | H04L 67/565 |
| 2024/0414123 | A1* | 12/2024 | Wane | H04L 65/1045 |

OTHER PUBLICATIONS

Chang, Li, et al. "Security implications of redirection trail in popular websites worldwide." Proceedings of the 26th International Conference on World Wide Web. 2017.*

Koop, Martin, Erik Tews, and Stefan Katzenbeisser. "In-depth evaluation of redirect tracking and link usage." Proceedings on Privacy Enhancing Technologies (2020).*

Feng, Xuewei, et al. "{Off-Path} Network Traffic Manipulation via Revitalized {ICMP} Redirect Attacks." 31st USENIX Security Symposium (USENIX Security 22). 2022.*

"An Overview of the SSL or TLS Handshake", https://www.ibm.com/docs/en/ibm-mq/7.5?topic=ssl-overview-tls-handshake, Jan. 27, 2023, downloaded Mar. 27, 2023.

"HTTP Request Methods", https://developer.mozilla.org/en-US/docs/Web/HTTP/Methods, Apr. 10, 2023, downloaded Mar. 27, 2023.

"Man-In-the-Middle Attack", https://en.wikipedia.org/wiki/Man-in-the-middle_attack, last edited Mar. 23, 2023, downloaded Mar. 27, 2023.

"Usage Statistics of Default Protocol Https for Websites", https://w3techs.com/technologies/details/ce-httpsdefault, Copyright 2009-2023, downloaded Mar. 14, 2023.

"What is Secure Web Gateway (SWG)?", https://www.paloaltonetworks.com/cyberpedia/what-is-secure-web-gateway, Copyright 2023, Mar. 28, 2023.

* cited by examiner

SECURING NETWORK TRAFFIC BETWEEN A WEB CLIENT AND A SECURE WEB GATEWAY

TECHNICAL FIELD

The present disclosure is directed to Internet security.

BACKGROUND

Web servers on the Internet host websites or other services that are accessible to many users. A user may access a web server using a web client, such as a computer running a web browser. A secure web gateway may be employed to protect web clients from cyber threats on the Internet. The secure web gateway inspects network traffic between the web client and the web server, including Hypertext Transfer Protocol (HTTP) traffic and Hypertext Transfer Protocol Secure (HTTPS) traffic. The secure web gateway may be deployed on-premises within a private computer network or on the cloud, i.e., over the Internet. U.S. Pat. No. 8,464,318 discloses an example secure web gateway. Secure web gateways are also commercially available from Trend Micro Incorporated, Palo Alto Networks Inc., ZScaler Inc., Forcepoint LLC, and other cybersecurity vendors.

BRIEF SUMMARY

In one embodiment, a secure web gateway is deployed on the cloud between a web client and a web server. The secure web gateway sends the web client a redirect response status code with a replacement server location in response to an HTTP request sent by the web client to the web server. The HTTP request includes an original server location. The replacement server location replaces an original Transmission Control Protocol (TCP) port in the original server location with a secure forwarding port and replaces an HTTP scheme in the original server location with an HTTPS scheme. An HTTPS connection is established between the web client and the secure web gateway. The secure web gateway thereafter receives from the web client an HTTPS request that includes the replacement server location. The secure web gateway sends the HTTPS request as an HTTP request to the web server, with the HTTP request including the original server location. The secure web gateway receives an HTTP response from the web server, and forwards the HTTP response as an HTTPS response to the web client.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
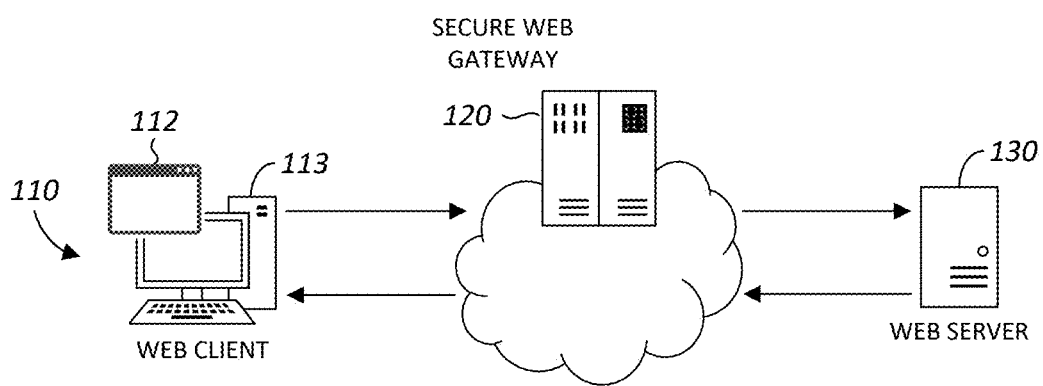
FIG. 1 is a schematic block diagram that illustrates deployment of a secure web gateway in accordance with an embodiment of the present invention.

FIG. 1 is a schematic block diagram that illustrates deployment of a secure web gateway 120 in accordance with an embodiment of the present invention. The secure web gateway 120 is deployed on the cloud between a web client 110 and a web server 130. The web client 110 comprises a client computer 113 (e.g., desktop, laptop, workstation, mobile device) running a client software 112 (e.g., web browser). The web server 130 comprises a server computer with associated server software. FIG. 1 shows a single web client and a single web server for clarity of illustration. In general, the secure web gateway 120 works in conjunction with a plurality of web clients and web servers.

The secure web gateway 120 is deployed on the cloud in that it communicates with the web client 110 and the web server 130 over the Internet. The secure web gateway 120 comprises a computer (e.g., security appliance, server computer) and associated security software for performing functionalities described herein. The secure web gateway 120 may be implemented on a dedicated computer system or on a cloud computing platform, such as the Amazon Web Services (AWS)™.

The secure web gateway 120 is deployed as a so-called "man-in-the-middle" (MI™) between the web client 110 and web servers on the Internet. Network traffic transmitted between the web client 110 and web servers on the Internet are routed through the secure web gateway 120. The secure web gateway 120 is configured to appear as a web server to a web client, and appear as a web client to a web server. The secure web gateway 120 is configured to inspect network traffic passing through the secure web gateway 120 to enforce security policies. Examples of such security policies include blocking (e.g., dropping) network traffic to or from malicious websites, blocking network traffic that has malicious payloads (e.g., viruses), blocking network traffic that transfers confidential data, etc. The deployment of the secure web gateway 120 as a man-in-the-middle, routing of network traffic to the secure web gateway 120, and the functionality of the secure web gateway 120 to inspect network traffic may be implemented using conventional methodologies without detracting from the merits of the present invention. Currently-existing secure web gateways may take advantage of embodiments of the present invention by including an option to perform secure connection processing as disclosed herein.

Generally, HTTP and HTTPS share the same HTTP protocol definitions except that HTTPS traffic is transmitted on a Transport Layer Security (TLS) connection. Typical web clients can communicate with web servers by HTTP or HTTPS (i.e., in accordance with the HTTP or HTTPS convention). However, some web servers still communicate with web clients only by HTTP. As will be more apparent below, secure connection processing allows for HTTPS communication between the web client 110 and the secure web gateway 120 when the web server 130 communicates with web clients by HTTP. This advantageously prevents eavesdropping or other malicious actions on the connection between the secure web gateway 120 and the web client 110.

In one embodiment, the secure web gateway 120 is configured to perform normal HTTP processing, normal HTTPS processing, or secure connection processing on received network traffic. The secure web gateway 120 performs normal HTTP processing on network traffic to communicate with the web client 110 and the web server 130 by HTTP in a given communication session. The secure web gateway 120 performs normal HTTPS processing on network traffic to communicate with the web client 110 and the web server 130 by HTTPS in a given communication session. The secure web gateway 120 performs secure connection processing on network traffic to communicate with the web client 110 by HTTPS and with the web server 130 by HTTP in a given communication session.

Figure 2:
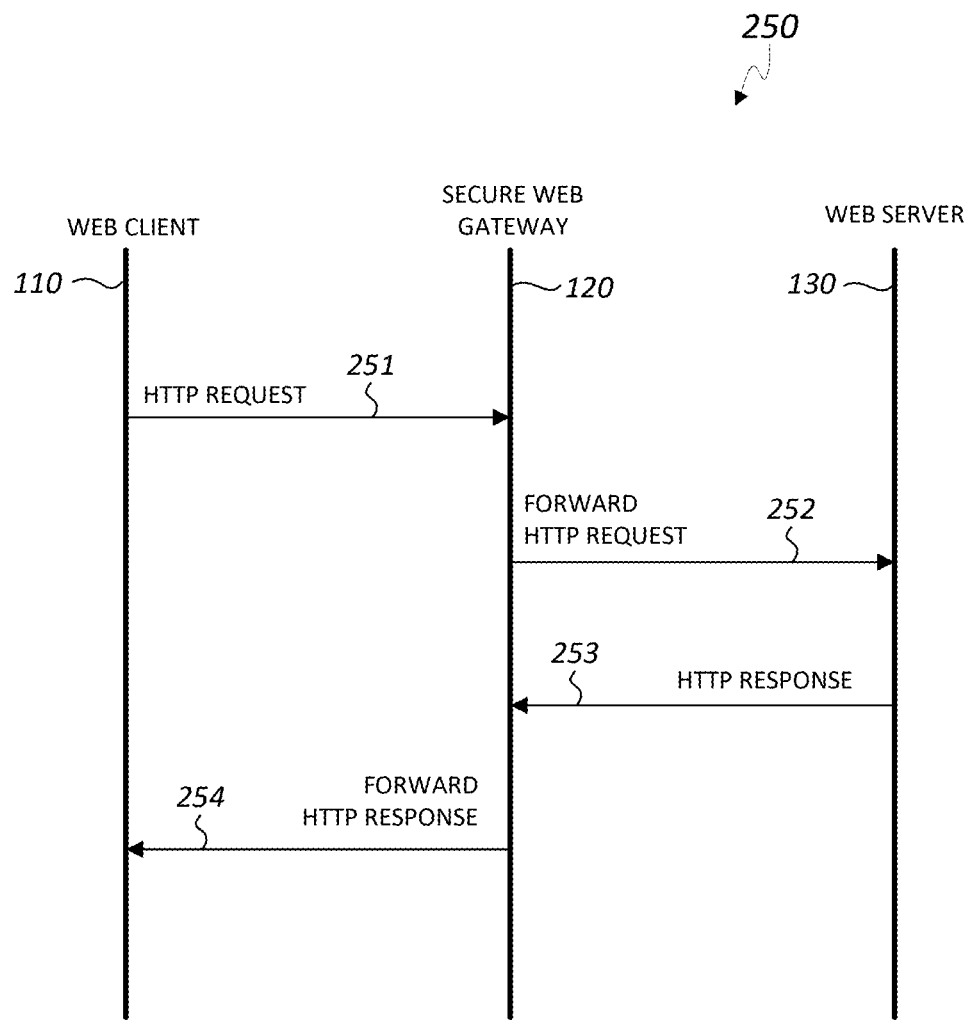
FIG. 2 is a call flow diagram of a method of processing network traffic transmitted between a web client and a web server when the web server communicates with web clients by HTTP, in accordance with an embodiment of the present invention.

FIG. 2 is a call flow diagram of a method 250 of processing network traffic transmitted between a web client and a web server when the web server communicates with web clients by HTTP, in accordance with an embodiment of the present invention. In one embodiment, the method 250 is performed by the secure web gateway 120 to perform normal HTTP processing on received network traffic when secure connection processing is not enabled or when the web server is in a bypass list.

The web client 110 sends an HTTP request to access a target resource on the web server 130 (see arrow 251), which communicates with web clients by HTTP in the example of FIG. 2. For purposes of the present disclosure an HTTP or HTTPS request to access a target resource is a request method other than a CONNECT method. In one embodiment, an HTTP or HTTPS request to access a target resource is a GET, POST, PUT, DELETE, HEAD, OPTIONS, TRACE, or PATCH method. The secure web gateway 120 receives the HTTP request, and forwards the HTTP request to the web server 130 (see arrow 252). In response to the HTTP request, the web server 130 sends an HTTP response to the web client 110 (see arrow 253). The secure web gateway 120 receives the HTTP response, and forwards the HTTP response to the web client 110 (see arrow 254). The secure web gateway 120 inspects the HTTP request and the HTTP response to enforce security policies. For purposes of the present disclosure, inspection of HTTP or HTTPS request/response includes inspection of corresponding network traffic (e.g., headers, payloads) to enforce security policies.

Figure 3:
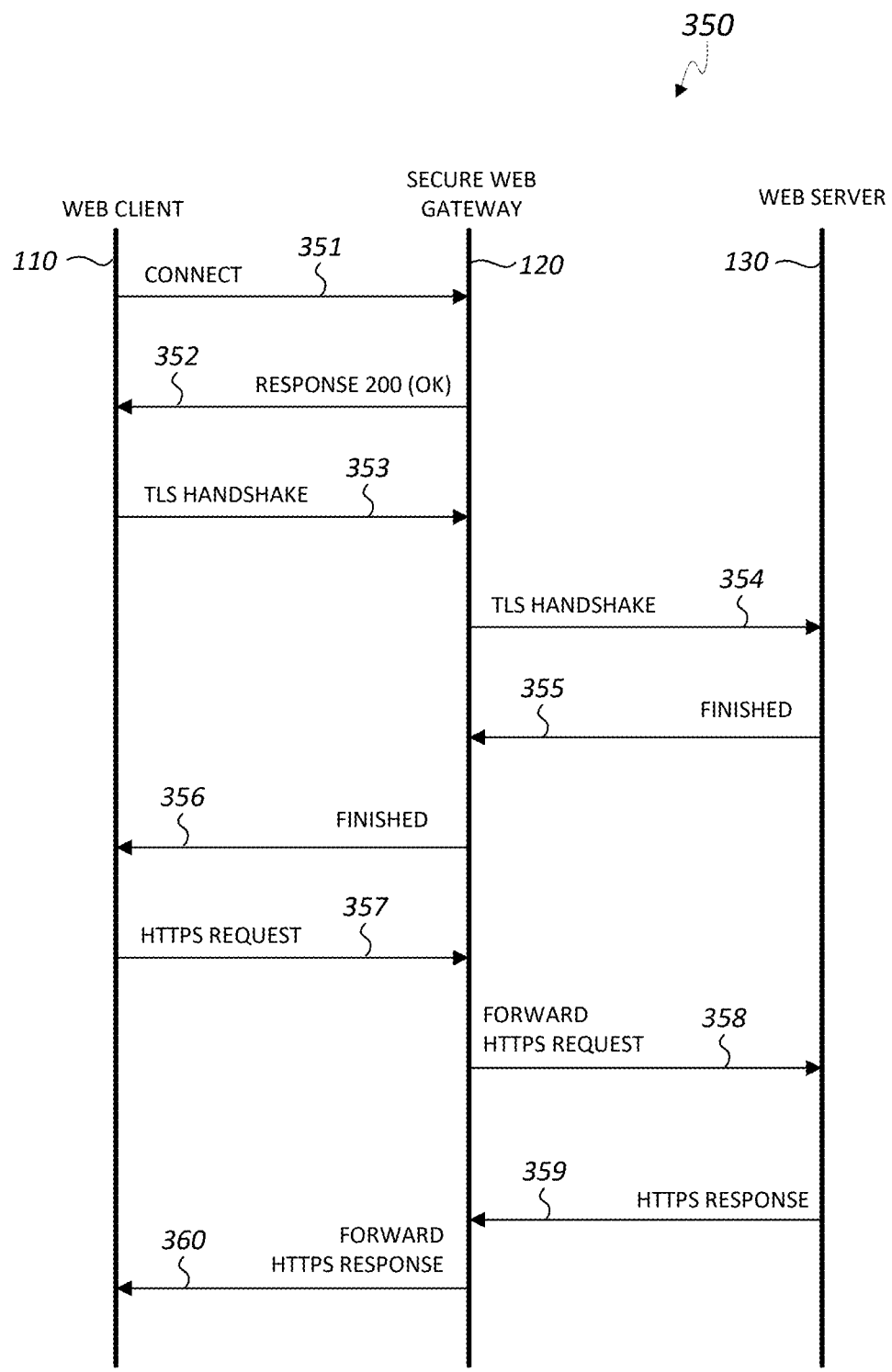
FIG. 3 is a call flow diagram of a method of processing network traffic transmitted between a web client and a web server when the web server communicates with web clients by HTTPS, in accordance with an embodiment of the present invention.

FIG. 3 is a call flow diagram of a method 350 of processing network traffic transmitted between a web client and a web server when the web server communicates with web clients by HTTPS, in accordance with an embodiment of the present invention. The secure web gateway 120 performs the method 350 to perform normal HTTPS processing on received network traffic. The web server 130 communicates with web clients by HTTPS in the example of FIG. 3.

The web client 110 sends a CONNECT method (see arrow 351) that is received by the secure web gateway 120. A CONNECT method is a request to establish an HTTPS connection with a web server by way of a proxy, which in this case is the secure web gateway 120. The secure web gateway 120 responds to the CONNECT method by sending an okay (OK) response status code (response code 200) to the web client 110 (see arrow 352), indicating that the web client 110 can proceed to establish an HTTPS connection. In response, the web client 110 initiates a TLS handshake operation (see arrow 353) with the secure web gateway 120.

In response to the TLS handshake operation initiated by the web client 110, the secure web gateway 120 initiates a TLS handshake operation with the web server 130 (see arrow 354). A TLS handshake operation, which is well-known in the art, involves a series of messages exchanged between a client and a server to create a secure connection between them. An HTTPS connection is on top of TLS, which is on top of TCP. At the end of the TLS handshake operation between the secure web gateway 120 and the web server 130, the web server 130 sends a finished message (see arrow 355) to the secure web gateway 120, thus establishing an HTTPS connection between the secure web gateway 120 and the web server 130. Similarly, at the end of the TLS handshake operation between the web client 110 and the secure web gateway 120, the secure web gateway 120 sends a finished message (see arrow 356) to the web client 110, thus establishing an HTTPS connection between the web client 110 and the secure web gateway 120.

The web client 110 sends an HTTPS request to access a target resource on the web server 130 (see arrow 357) over the HTTPS connection between the web client 110 and the secure web gateway 120. The secure web gateway 120 receives the HTTPS request, and sends a corresponding HTTPS request to the web server 130 (see arrow 358) over the HTTPS connection between the secure web gateway 120 and the web server 130. In response to the received HTTPS request, the web server 130 sends an HTTPS response to the secure web gateway 120 (see arrow 359) over the HTTPS connection between the secure web gateway 120 and the web server 130. The secure web gateway 120 receives the HTTPS response from the web server 130 and sends a corresponding HTTPS response to the web client 110 (see arrow 360) over the HTTPS connection between the secure web gateway 120 and the web client 110. The secure web gateway 120 inspects the HTTPS requests and responses passing through the secure web gateway 120 to enforce security policies.

Figure 4:
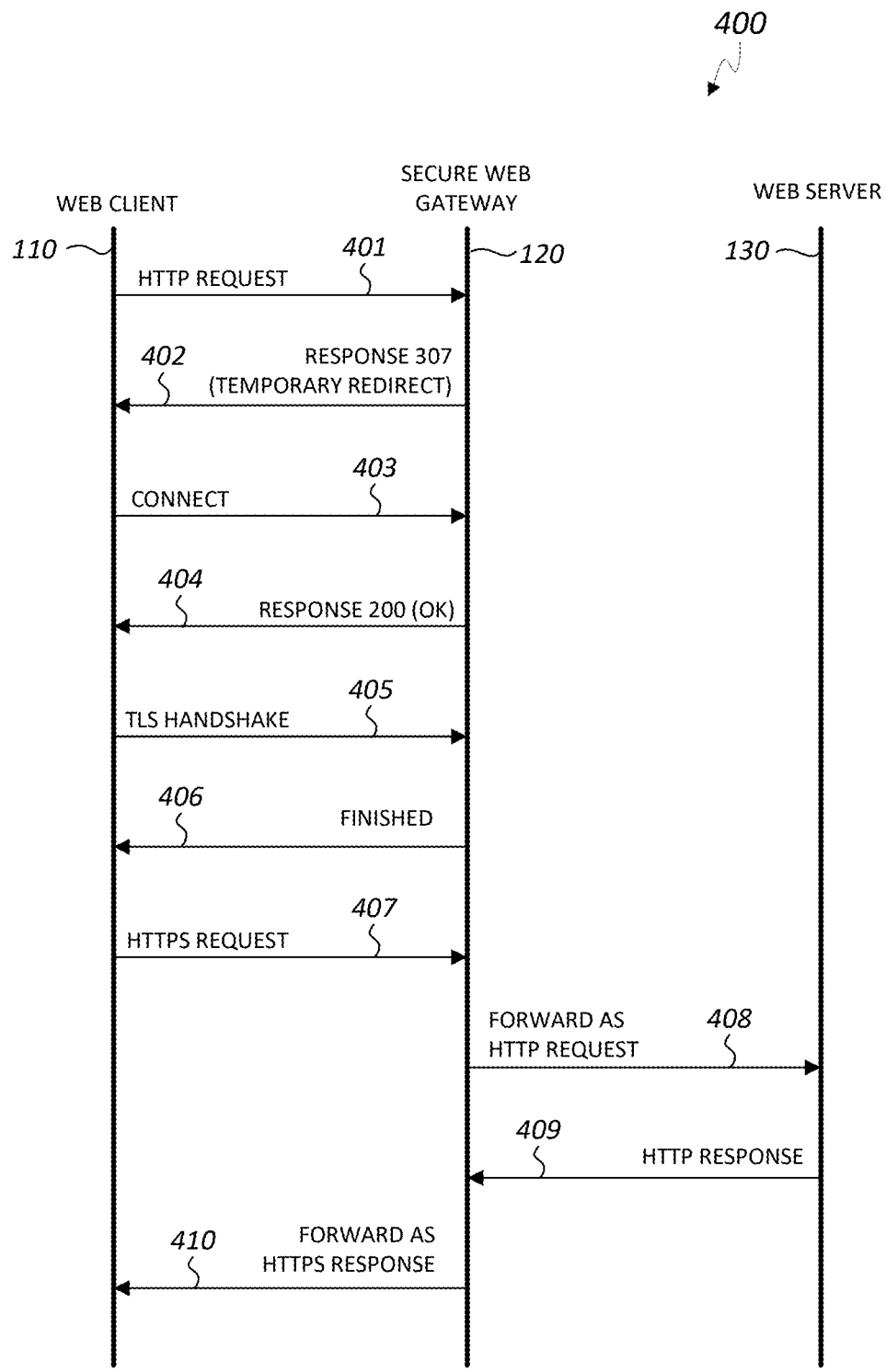
FIG. 4 is a call flow diagram of a method of performing secure connection processing on network traffic transmitted between a web client and a web server when the web server communicates with web clients by HTTP, in accordance with an embodiment of the present invention.

FIG. 4 is a call flow diagram of a method 400 of performing secure connection processing on network traffic transmitted between a web client and a web server when the web server communicates with web clients by HTTP, in accordance with an embodiment of the present invention. In one embodiment, the secure web gateway 120 performs the method 400 to perform secure connection processing on received network traffic when secure connection processing is enabled and the web server is not in a bypass list.

Because the web server 130 communicates with web clients only by HTTP in the example of FIG. 4, the web client 110 sends an HTTP request to access a target resource on the web server 130 (see arrow 401). The secure web gateway 120 receives the HTTP request and, in response, sends a redirect response status code (response code 307) (see arrow 402) to the web client 110. The redirect response status code indicates to the web client 110 that the web server 130 has temporarily moved to a new location. The new location of the web server sent with the redirect response status code is referred to herein as "replacement server location", which includes a secure forwarding port and a unique web server identifier that is assigned to the HTTP request. The web client 110 sends a CONNECT method to the replacement server location (see arrow 403), which is received by the secure web gateway 120. The secure web gateway 120 sends an okay response status code to the web client 110 (see arrow 404), signaling the web client 110 to proceed with initiating establishment of an HTTPS connection between the web client 110 and the secure web gateway 120. In response, the web client 110 proceeds with initiating a TLS handshake operation with the secure web gateway 120 (see arrow 405). At the end of the TLS handshake operation, the secure web gateway 120 sends a finished message to the web client 110 (see arrow 406), thus establishing an HTTPS connection between the web client 110 and the secure web gateway 120.

The web client 110 sends an HTTPS request to access the target resource on the web server 130, with the HTTPS request having the replacement server location (see arrow 407). The secure web gateway 120 receives the HTTPS request over the HTTPS connection between the web client 110 and the secure web gateway 120, and forwards the HTTPS request as an HTTP request to access the target resource on the web server 130 (see arrow 408). In response to the received HTTP request, the web server 130 sends an HTTP response to the secure web gateway 120 (see arrow 409). The secure web gateway 120 forwards the HTTP response to the web client 110 over the HTTPS connection between the web client 110 and the secure web gateway 120 (see arrow 410). The secure web gateway 120 inspects the HTTP/HTTPS requests and responses passing through the secure web gateway 120 to enforce security policies.

Figure 5:
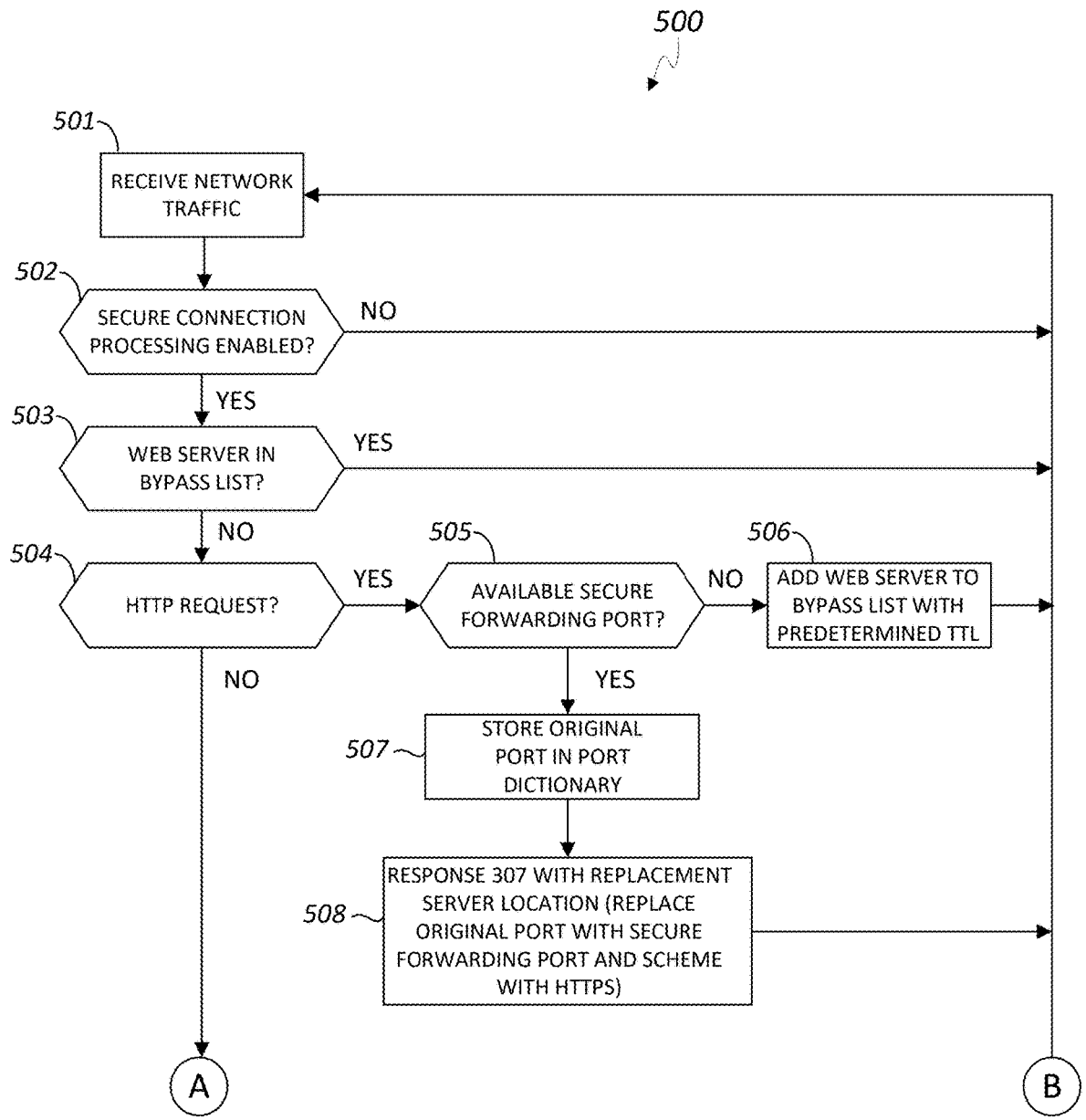
FIGS. 5 and 6 show a flow diagram of a method of performing secure connection processing on network traffic transmitted between a web client and a web server when the web server communicates with web clients by HTTP, in accordance with an embodiment of the present invention.
Figure 6:
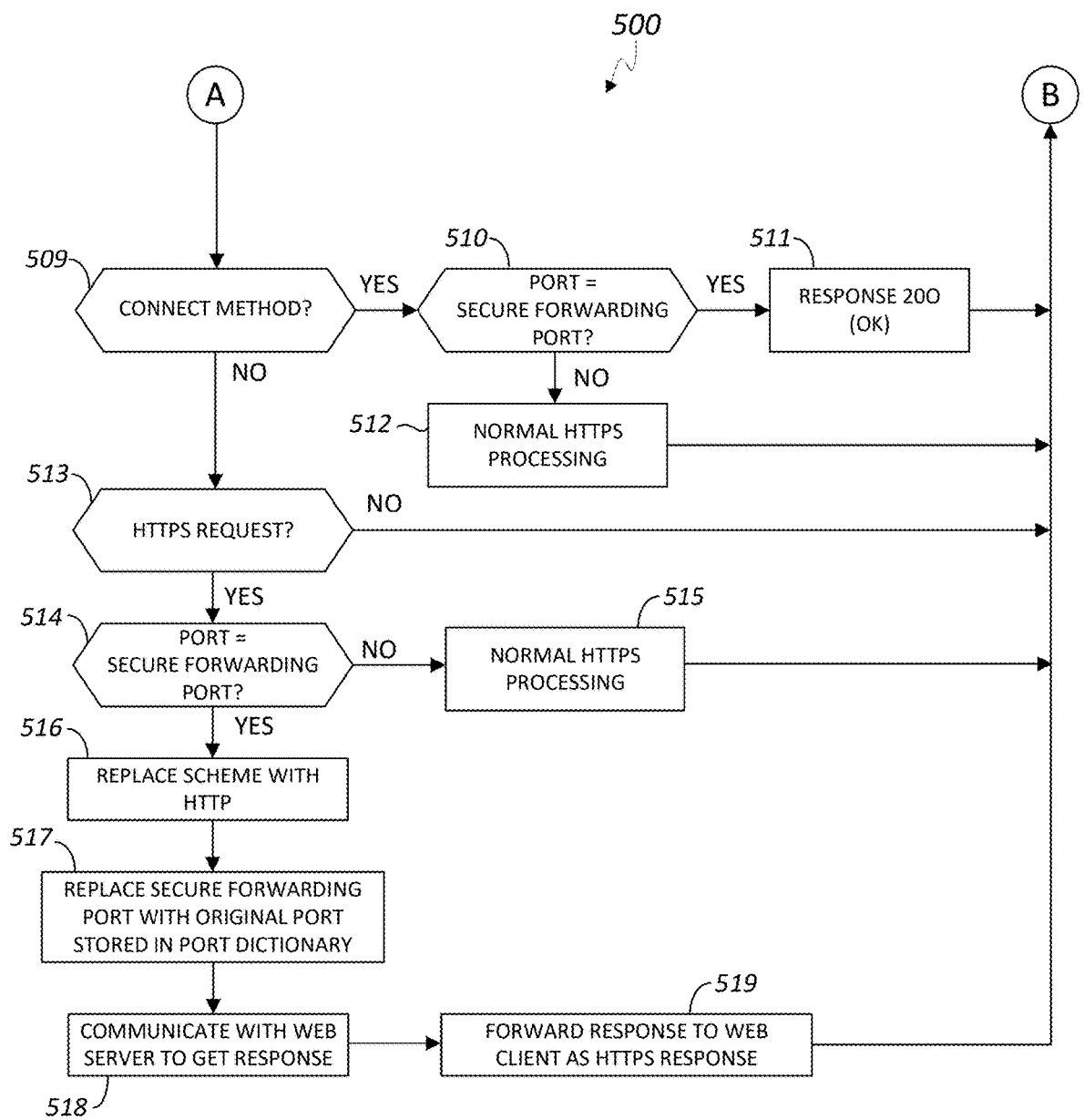

FIGS. 5 and 6 show a flow diagram of a method 500 of performing secure connection processing on network traffic transmitted between a web client and a web server when the web server communicates with web clients by HTTP, in accordance with an embodiment of the present invention. The method 500 is performed by the secure web gateway 120 to perform secure connection processing on received network traffic.

In one embodiment, the method 500 is performed in conjunction with predefined secure forwarding ports, unique web server identifiers, a port dictionary, and a bypass list.

A secure forwarding port is a reserved TCP port that is dedicated for securing the connection between a web client and a secure web gateway. A secure forwarding port may be any arbitrary (and preferably not common) TCP port. For example, a secure forwarding port may be TCP port 9000. In that example, the secure forwarding port may be defined as {SECURE_HTTP_FORWARDING_PORT}=9000. In one embodiment, a plurality of secure forwarding ports are allocated for communications with a single web server.

In secure connection processing, each HTTP request is assigned a unique web server identifier. In one embodiment, a unique web server identifier is formed by combining the domain name of the web server involved in the HTTP request and TCP port used by the web server for HTTP as in,

{UNIQUE_WEB_SERVER_ID}={REQUEST SERVER DOMAIN}+"|"+{REQUEST SERVER PORT}

For example, a unique web server identifier for an HTTP request made by a web client to access a target resource on a web server may be "www.example.com|80", where "example.com" is the domain name of the web server and "80" is the TCP port used by the web server for HTTP. The TCP port used by the web server for HTTP is also referred to herein as "the HTTP port" of the web server.

An original HTTP port is the HTTP port of the web server as indicated in the HTTP request. A port dictionary is a global map for storing original HTTP ports and secure forwarding ports, indexed by their corresponding unique web server identifiers. For a given HTTP request, the original HTTP port indicated in the HTTP request, the secure forwarding port assigned to the HTTP request, and the unique web server identifier assigned to the HTTP request are stored in the port dictionary for subsequent lookup.

A bypass list comprises records of web servers that are exempt from secure connection processing. When a web server is in the bypass list (i.e., has a corresponding unexpired record in the bypass list), the secure web gateway performs, on network traffic transmitted between a web client and the web server, normal HTTP processing as in the method 250 (shown in FIG. 2) or normal HTTPS processing as in the method 350 (shown in FIG. 3) depending on whether the web server communicates with web clients by HTTP or HTTPS.

Each record in a bypass list indicates an exempted web server identified by the domain name of the web server, the HTTP port of the web server, a timestamp of when the record was created, and a time-to-live (TTL). The TTL indicates how long the web server will remain in the bypass list. The timestamp may be compared to the TTL to determine if the TTL has expired. The secure web gateway periodically checks the bypass list and automatically removes records of web servers that have an expired TTL. In one embodiment, a TTL of −1 indicates that the record of the corresponding web server remains indefinitely in the bypass list, until manually removed by a system administrator. One or more default TTL values may be predefined, e.g., DEFAULT_BYPASS_TTL=3600 for a TTL of 3600 seconds.

Referring first to FIG. 5, the secure web gateway receives all network traffic transmitted between the web client and the web server (step 501). The secure web gateway determines if secure connection processing is enabled (step 502). If secure connection processing is not enabled, the secure web gateway continues to receive network traffic transmitted between the web client and the web server (step 502 to step 501). If secure connection processing is enabled, the secure web gateway determines if the web server is in the bypass list (step 502 to step 503). If the web server is in the bypass list, the web server is exempted from secure connection processing and the secure web gateway simply continues to receive network traffic transmitted between the web client and the web server (step 503 to step 501).

In cases where secure connection processing is not performed on network traffic, such as when secure connection processing is not enabled or when the web server is in the bypass list, the secure web gateway communicates with the web client and the web server according to their defined communication convention. For example, when the web client and the web server communicate by HTTP, the secure web gateway communicates with the web client and the web server by HTTP as in the method 250 of FIG. 2. As another example, when the web client and the web server communicate by HTTPS, the secure web gateway communicates with the web client and the web server by HTTPS as in the method 350 of FIG. 3.

In the method 500, when secure connection processing is enabled (step 502 to step 503) and the web server is not in the bypass list (step 503 to step 504), the secure web gateway performs secure connection processing on received network traffic as follows.

If the network traffic is an HTTP request to access a target resource, the secure web gateway checks if there is an available secure forwarding port (step 504 to step 505). If there is no available secure forwarding port, such as when all of the reserved forwarding ports have already been assigned as indicated in the port dictionary, the secure web gateway adds the web server to the bypass list with a default TTL (step 505 to step 506). The default TTL (e.g., DEFAULT_BYPASS_TTL=3600, for a TTL of 3600 seconds) may just be long enough to expire when a secure forwarding port may become available. The secure web gateway thereafter continues to receive network traffic transmitted between the web client and the web server (step 506 to step 501).

If there is an available secure forwarding port, the secure web gateway stores the original HTTP port (i.e., TCP port used by the web server for HTTP as indicated in the HTTP request) in the port dictionary (step 505 to step 507). In the port dictionary, the original HTTP port and the secure forwarding port are indexed by the unique web server identifier assigned to the HTTP request. The secure web gateway then sends a redirect response status code (response code 307) to the web client with a replacement server location (step 508), and thereafter continues to receive network traffic transmitted between the web client and the web server (step 508 to step 501).

The redirect response status code informs the web client that the web server has temporarily moved, which in this case is from an original server location of the web server to the replacement server location. The original server location may be in terms of a Uniform Resource Identifier (URI). In one embodiment, the replacement server location is the original server location with the original HTTP port being replaced with the secure forwarding port and the scheme being replaced with an HTTPS scheme. For example, assuming the original server location is "http://www.example.com", the replacement server location may be "https://www.example.com:9000/", where "9000" is the secure forwarding port. In that example, the redirect response status code returned to the web client may be as follows:

HTTP/1.1 307 Temporary Redirect
Content-Type: text/html
Location: https://www.example.com:9000/
Cache-Control: max-age=86400
Content-Length: 18

In the above example, the Cache-Control header with max-age=86400 means that after the web client receives the redirection, in 86400 seconds, the web client should directly redirect to the replacement server location in the client side. This can advantageously save a Round Trip Time from the web client to the secure web gateway.

Continuing in FIG. 6, if the network traffic is not an HTTP request to access a target resource, the secure web gateway determines if the network traffic is a CONNECT method (FIG. 5, step 504 to FIG. 6, step 509). If the network traffic is a CONNECT method, the secure web gateway determines if the TCP port of the CONNECT method is a secure forwarding port (step 509 to step 510). If the TCP port of the CONNECT method is a secure forwarding port, the secure web gateway sends an okay response status code (response code 200) to the web client (step 510 to step 511), indicating that it is okay for the web client to proceed to establish an HTTPS connection between the web client and the secure web gateway. The secure web gateway thereafter continues to receive network traffic transmitted between the web client and the web server (FIG. 6, step 511 to FIG. 5, step 501). An example okay response status code returned to the web client when the TCP port of the CONNECT method is a secure forwarding port may be: "HTTP/1.1 200 OK".

If the TCP port of the CONNECT method is not a secure forwarding port, the secure web gateway processes the CONNECT method in accordance with normal HTTPS processing as in the method 350 of FIG. 3 (step 510 to step 512). The secure web gateway thereafter continues to receive network traffic transmitted between the web client and the web server (FIG. 6, step 512 to FIG. 5, step 501).

If the network traffic is not a CONNECT method, the secure web gateway determines if the network traffic is an HTTPS request to access a target resource (step 509 to step 513). If the network traffic is not an HTTPS request to access a target resource, the secure web gateway continues to receive network traffic transmitted between the web client and the web server (FIG. 6, step 513 to FIG. 5, step 501).

If the network traffic is an HTTPS request to access a target resource, the secure web gateway determines if the TCP port of the HTTPS request is a secure forwarding port (step 513 to step 514). If the TCP port of the HTTPS request is not a secure forwarding port, the secure web gateway processes the HTTPS request in accordance with normal HTTPS processing as in the method 350 of FIG. 3 (step 514 to step 515). The secure web gateway thereafter continues to receive network traffic transmitted between the web client and the web server (FIG. 6, step 515 to FIG. 5, step 501).

If the TCP port of the HTTPS request is a secure forwarding port (step 514 to step 516), the secure web gateway forwards the HTTPS request as an HTTP request to the web server as follows. The secure web gateway recreates the original server location by replacing the scheme of the server location in the HTTPS request with an HTTP scheme (step 516) and replacing the secure forwarding port in the HTTPS request with the original HTTP port that is stored in the port dictionary and indexed by the unique web server identifier of the corresponding HTTP request (step 517). Using the original server location, the secure web gateway communicates with the web server by HTTP to get a corresponding HTTP response (step 518). The secure web gateway receives the HTTP response from the web server, and forwards the HTTP response as an HTTPS response to the web client over the HTTPS connection between the secure web gateway and the web client (step 519). The secure web gateway thereafter continues to receive network traffic transmitted between the web client and the web server (FIG. 6, step 519 to FIG. 5, step 501).

Figure 7:
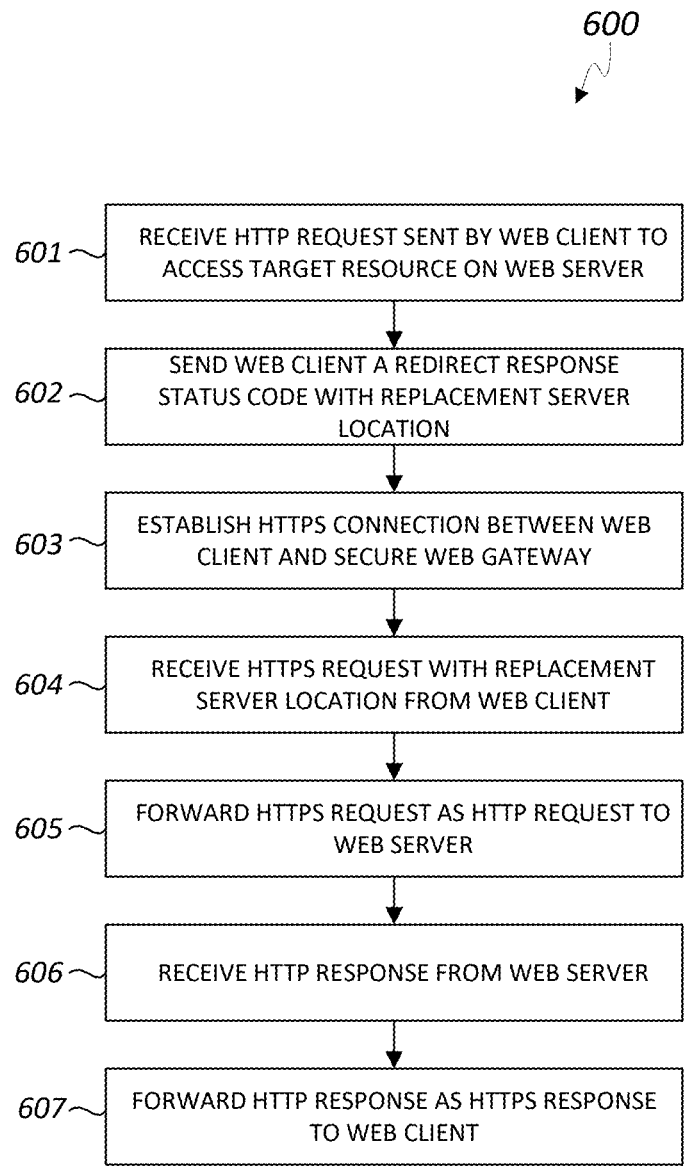
FIG. 7 is a flow diagram of a method of securing network traffic between a web client and a secure web gateway, in accordance with an embodiment of the present invention.

FIG. 7 is a flow diagram of a method 600 of securing network traffic between a web client and a secure web gateway, in accordance with an embodiment of the present invention. The method 600 may be performed by the secure web gateway 120. As can be appreciated, the method 600 may also be employed using other components without detracting from the merits of the present invention.

In the example of FIG. 7, the secure web gateway receives a first HTTP request to access a target resource on a web server on the Internet (step 601). The resource may be a web page, document, or other object on the web server. The first HTTP request has an original server location of the target resource on the web server and an original HTTP port. In response to the first HTTP request, the secure web gateway sends a redirect response status code to the web client, the redirect response status code including a replacement server location (step 602). The replacement server location replaces the scheme of the original server location with an HTTPS scheme and replaces the original HTTP port of the original server location with a secure forwarding port. The web client and the secure web gateway establishes an HTTPS connection between the web client and the secure web gateway (step 603). The secure web gateway receives from the web client an HTTPS request to access the target resource, the HTTPS request having the replacement server location (step 604). The secure web gateway receives the HTTPS request over the HTTPS connection between the web client and the secure web gateway. Using the original server location, the secure web gateway forwards the HTTPS request as a second HTTP request to the web server (step 605). The secure web gateway receives from the web server an HTTP response that is responsive to the second HTTP request (step 606). The secure web gateway forwards the HTTP response as an HTTPS response to the web client over the HTTPS connection between the secure web gateway and the web client (step 607). The secure web gateway inspects network traffic between the web client and the web server to enforce security policies. For example, when the target resource is a web page hosted by the web server, the secure web gateway may inspect the web page for prohibited content (e.g., malicious scripts, malicious Uniform Resource Locators, etc.). In that example, the secure web gateway may prevent the web page from being received by the web client when the web page includes content prohibited by the security policy.

Figure 8:
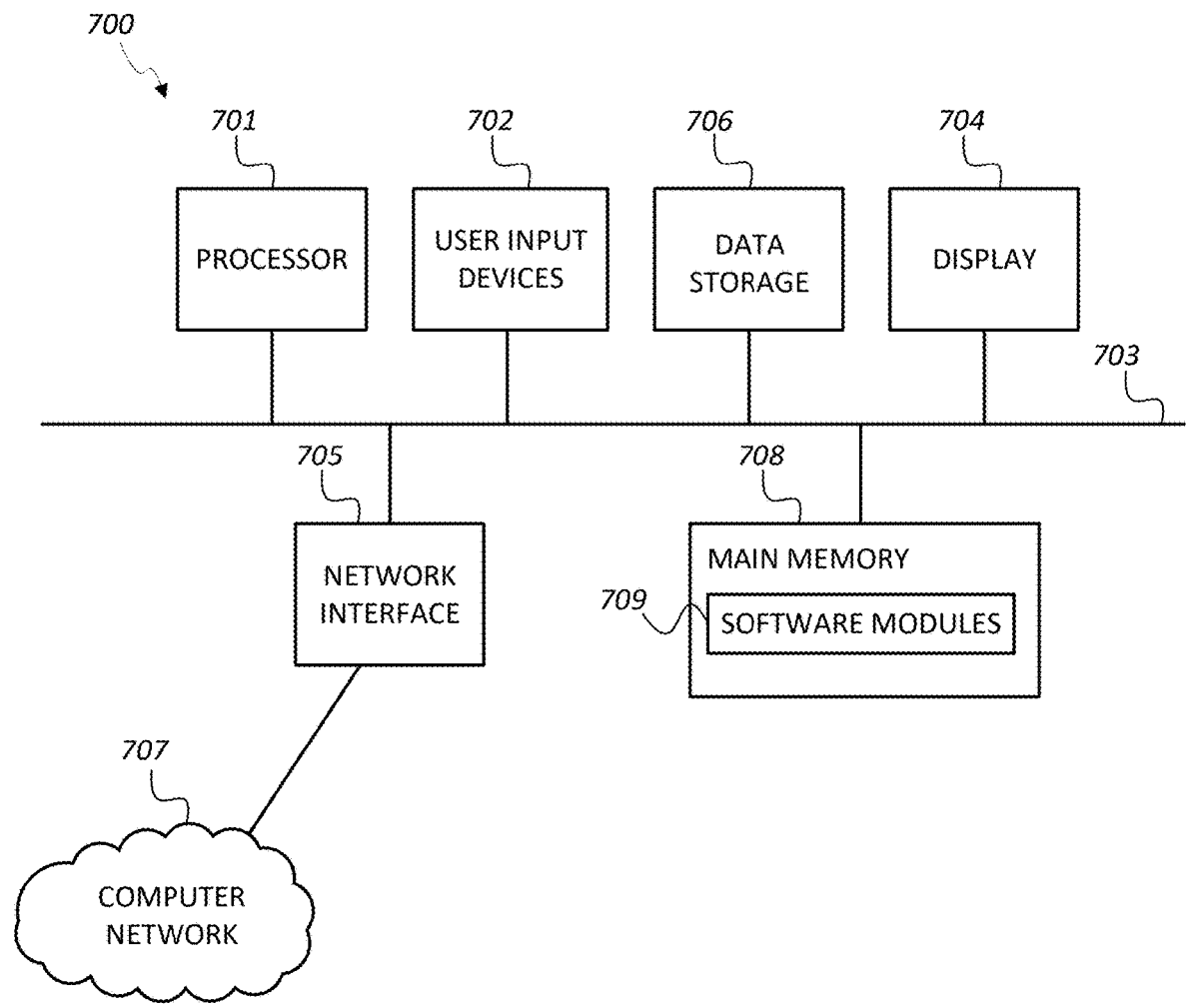
FIG. 8 is a block diagram of a computer system that may be employed with embodiments of the present invention.

Referring now to FIG. 8, there is shown a block diagram of a computer system 700 that may be employed with embodiments of the present invention. The computer system 700 may be employed as a secure web gateway or other computer described herein. The computer system 700 may have fewer or more components to meet the needs of a particular cybersecurity application. The computer system 700 may include one or more processors 701. The computer system 700 may have one or more buses 703 coupling its various components. The computer system 700 may include one or more user input devices 702 (e.g., keyboard, mouse), one or more data storage devices 706 (e.g., hard drive, optical disk, solid state drive), a display screen 704 (e.g., liquid crystal display, flat panel monitor), a computer network interface 705 (e.g., network adapter, modem), and a main memory 708 (e.g., random access memory). The computer network interface 705 may be coupled to a computer network 707, which in this example includes the Internet.

The computer system 700 is a particular machine as programmed with one or more software modules 709, comprising instructions stored non-transitory in the main memory 708 for execution by the processor 701 to cause the computer system 700 to perform corresponding programmed steps. An article of manufacture may be embodied as computer-readable storage medium including instructions that when executed by the processor 701 cause the computer system 700 to be operable to perform the functions of the one or more software modules 709. In the embodiment where the computer system 700 is employed as a secure web gateway, the software modules 709 may comprise instructions for performing normal HTTP processing, normal HTTPS processing, and secure connection processing as described herein.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of securing a connection between a web client and a secure web gateway, the method comprising:

receiving in a secure web gateway a first Hypertext Transfer Protocol (HTTP) request to access a target resource on a web server, the secure web gateway being deployed on the cloud between a web client and the web server, the first HTTP request being sent by the web client and including an original server location;

sending a redirect response status code from the secure web gateway to the web client, the redirect response status code being responsive to the first HTTP request and including a replacement server location;

establishing a Hypertext Transfer Protocol Secure (HTTPS) connection between the web client and the secure web gateway;

receiving in the secure web gateway an HTTPS request to access the target resource, the HTTPS request being received by the secure web gateway over the HTTPS connection and including the replacement server location;

forwarding the HTTPS request as a second HTTP request from the secure web gateway to the web server, the second HTTP request including the original server location;

receiving an HTTP response in the secure web gateway, the HTTP response being responsive to the second HTTP request; and forwarding the HTTP response as an HTTPS response from the secure web gateway to the web client.

2. The method of claim 1, wherein the replacement server location includes a secure forwarding port and has an HTTPS scheme.

3. The method of claim 2, wherein the replacement server location is formed by replacing an original Transmission Control Protocol (TCP) port of the original server location with the secure forwarding port and replacing an HTTP scheme of the original server location with the HTTPS scheme.

4. The method of claim 1, wherein forwarding the HTTPS request as the second HTTP request comprises:

replacing an HTTPS scheme of the replacement server location in the HTTPS request with an HTTP scheme; and replacing the secure forwarding port of the replacement server location in the HTTPS request with an original HTTP port of the original server location.

5. The method of claim 1, wherein establishing the HTTPS connection between the web client and the secure web gateway comprises:

receiving a CONNECT method in the secure web gateway, the CONNECT method including the replacement server location and being responsive to the redirect response status code;

sending an okay response status code from the secure web gateway to the web client, the okay response status code being responsive to the CONNECT method; and receiving initiation of a Transport Layer Security (TLS) handshake operation in the secure web gateway, the TLS handshake operation being initiated by the web client in response to receiving the okay response status code from the secure web gateway.

6. The method of claim 1, further comprising:

the secure web gateway determining if secure connection processing is enabled in the secure web gateway, wherein the secure web gateway sends the redirect response status code to the web client in response to the secure connection processing being enabled in the secure web gateway.

7. The method of claim 1, further comprising:

the secure web gateway determining if the web server is in a bypass list, wherein the secure web gateway sends the redirect response status code to the web client in response to the web server not being in the bypass list.

8. The method of claim 7, wherein the secure web gateway is configured to not send the redirect response status code to the web client when the web server is in the bypass list.

9. The method of claim 8, wherein the bypass list includes records of web servers that are exempted from secure connection processing, with each record in the bypass list including a time-to-live (TTL).

10. The method of claim 9, wherein the secure web gateway automatically removes records that have an expired TTL from the bypass list.

11. A secure web gateway that is deployed on a cloud between a web client and a web server, the secure web gateway comprising at least one processor and a memory, the memory storing instructions that when executed by the at least one processor cause the secure web gateway to:

receive a first Hypertext Transfer Protocol (HTTP) request sent by the web client to access a target resource on the web server, the first HTTP request including an original server location;

send the web client a redirect response status code that includes a replacement server location;

receive from the web client a Hypertext Transfer Protocol Secure (HTTPS) request to access the target resource, the HTTPS request including the replacement server location and being received in the secure web gateway over an HTTPS connection between the secure web gateway and the web client;

forward the HTTPS request as a second HTTP request to the web server, the second HTTP request including the original server location;

receive from the web server an HTTP response that is responsive to the second HTTP request; and forward the HTTP response as an HTTPS response to the web client.

12. The secure web gateway of claim 11, wherein the replacement server location includes a secure forwarding port and has an HTTPS scheme.

13. The secure web gateway of claim 12, wherein the instructions stored in the memory of the secure web gateway, when executed by the at least one processor of the secure web gateway, cause the secure web gateway to form the replacement server location by replacing an original HTTP port of the original server location with the secure forwarding port and replacing an HTTP scheme of the original server location with an HTTPS scheme.

14. The secure web gateway of claim 11, wherein the instructions stored in the memory of the secure web gateway, when executed by the at least one processor of the secure web gateway, cause the secure web gateway to forward the HTTPS request as the second HTTP request by:

replacing an HTTPS scheme of the replacement server location in the HTTPS request with an HTTP scheme; and replacing the secure forwarding port of the replacement server location in the HTTPS request with an original HTTP port of the original server location.

15. A method of securing a connection between a web client and a secure web gateway, the secure web gateway being deployed between the web client and a web server, the method being performed by the secure web gateway and comprising:

receiving from the web client a first Hypertext Transfer Protocol (HTTP) request to access a target resource on the Internet, the target resource being hosted by the web server;

after receiving the first HTTP request, establishing a Hypertext Transfer Protocol Secure (HTTPS) connection to the web client;

receiving from the web client an HTTPS request to access the target resource, the HTTPS request being received by the secure web gateway over the HTTPS connection;

forwarding the HTTPS request as a second HTTP request to the web server;

receiving from the web server an HTTP response that is responsive to the second HTTP request; and forwarding, over the HTTPS connection, the HTTP response as an HTTPS response to the web client.

16. The method of claim 15, wherein forwarding the HTTPS request as the second HTTP request comprises:

replacing an HTTPS scheme of a replacement server location in the HTTPS request with an HTTP scheme; and replacing a secure forwarding port of the replacement server location in the HTTPS request with an original HTTP port, with the original HTTP port being of an original server location in the first HTTP request.

17. The method of claim 15, further comprising:

in response to receiving the first HTTP request from the web client, sending the web client a redirect response status code that has a replacement server location, wherein the HTTPS request includes the replacement server location.

18. The method of claim 17, wherein the replacement server location is formed by replacing an HTTP scheme of an original server location in the first HTTP request with an HTTPS scheme and replacing an original HTTP port of the original server location in the first HTTP request with a secure forwarding port.

19. The method of claim 17, further comprising:

determining if the web server is in a bypass list, wherein the redirect response status code is sent to the web client in response to the web server not being in the bypass list.

20. The method of claim 17, further comprising:

after sending the redirect response status code to the web client, receiving from the web client a message to initiate a Transport Layer Security (TLS) handshake operation to establish the HTTPS connection between the secure web gateway and the web client.

* * * * *